(12) United States Patent
Gillard et al.

(10) Patent No.: US 12,347,436 B2
(45) Date of Patent: Jul. 1, 2025

(54) METHOD AND SYSTEM FOR PERSISTING A CONVERSATION ACROSS MULTIPLE COMMUNICATION CHANNELS

(71) Applicant: JPMorgan Chase Bank, N.A., New York, NY (US)

(72) Inventors: Andrew Gillard, Bournemouth (GB); Katie Bagley, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 266 days.

(21) Appl. No.: 18/198,490

(22) Filed: May 17, 2023

(65) Prior Publication Data

US 2024/0386896 A1    Nov. 21, 2024

(51) Int. Cl.
| | | |
|---|---|---|
| *G10L 15/30* | (2013.01) | |
| *G10L 15/22* | (2006.01) | |
| *G10L 15/32* | (2013.01) | |

(52) U.S. Cl.
CPC .............. *G10L 15/30* (2013.01); *G10L 15/22* (2013.01); *G10L 15/32* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 10,162,816 B1 * | 12/2018 | Banerjee | ............... | G06F 40/205 |
| 10,366,168 B2 * | 7/2019 | Wu | ........................... | G06N 7/01 |
| 10,630,840 B1 * | 4/2020 | Karp | ................... | H04M 3/5235 |
| 10,796,217 B2 * | 10/2020 | Wu | ..................... | G06Q 10/1053 |
| 10,832,008 B2 * | 11/2020 | Banerjee | ............... | G06F 40/253 |
| 10,958,600 B1 * | 3/2021 | Annadata | ................ | H04L 51/02 |
| 10,978,056 B1 * | 4/2021 | Challa | .................... | G06N 5/025 |
| 11,032,421 B2 * | 6/2021 | Karp | ..................... | H04W 12/69 |
| 11,184,298 B2 * | 11/2021 | Freed | ...................... | G06F 18/23 |
| 11,263,402 B2 * | 3/2022 | Tan | ........................ | G06F 40/35 |
| 11,397,857 B2 * | 7/2022 | Drzewucki | ........... | G06F 40/295 |
| 11,409,425 B2 * | 8/2022 | Yaseen | .................. | G06F 3/0482 |

(Continued)

FOREIGN PATENT DOCUMENTS

| | | | | |
|---|---|---|---|---|
| WO | WO-2017173141 A1 * | 10/2017 | ............... | G06F 1/16 |
| WO | WO-2023129682 A1 * | 7/2023 | ........... | G06F 40/279 |

*Primary Examiner* — Marcus T Riley

(74) *Attorney, Agent, or Firm* — GREENBLUM & BERNSTEIN, P.L.C.

(57) ABSTRACT

A method and a system for persisting a human-machine conversation across multiple communication channels so as to facilitate continuity of the conversation regardless of which mode of communication is being utilized at any particular moment are provided. The method includes: receiving, from a user via a first channel, a first communication; transmitting, to the user via the first channel, a second communication that is responsive to the first communication; receiving, from a user via a second channel that is different from the first channel, a third communication; determining that the third communication is responsive to the second communication based on a content of the third communication, and that each of the first, second, and third communications are part of the same conversation; and generating a fourth communication that is a continuation of the first conversation, and transmitting the fourth communication to the user via the second channel.

20 Claims, 5 Drawing Sheets

(56) References Cited

U.S. PATENT DOCUMENTS

| | | | |
|---|---|---|---|
| 11,599,731 B2* | 3/2023 | Galitsky | G06Q 30/016 |
| 11,989,525 B2* | 5/2024 | Galitsky | G06N 20/00 |
| 12,095,949 B2* | 9/2024 | Te Booij | H04M 3/5116 |
| 12,260,175 B2* | 3/2025 | Gupta | G06Q 30/0201 |
| 12,267,401 B2* | 4/2025 | Gelfenbeyn | H04L 67/55 |
| 2015/0172892 A1* | 6/2015 | Karaoguz | H04W 88/06 |
| | | | 455/414.4 |
| 2018/0196796 A1* | 7/2018 | Wu | G06F 40/289 |
| 2020/0259774 A1* | 8/2020 | Goenka | H04L 67/306 |
| 2021/0067470 A1* | 3/2021 | Freed | G06F 18/23 |
| 2021/0103703 A1* | 4/2021 | Galitsky | G06N 5/04 |
| 2021/0272187 A1* | 9/2021 | Trainor | G06Q 30/0641 |
| 2022/0050963 A1* | 2/2022 | Shipman | G06F 40/20 |
| 2023/0029645 A1* | 2/2023 | Schrieber | H04L 65/1096 |
| 2023/0153521 A1* | 5/2023 | Galitsky | G06F 16/322 |
| | | | 704/9 |
| 2023/0153540 A1* | 5/2023 | Galitsky | G06Q 30/0631 |
| | | | 704/9 |
| 2023/0208971 A1* | 6/2023 | Te Booij | G06Q 30/01 |
| 2023/0367967 A1* | 11/2023 | Filipchuk | G06F 16/3344 |
| 2023/0401380 A1* | 12/2023 | Gupta | G06Q 30/0201 |
| 2024/0386896 A1* | 11/2024 | Gillard | G10L 15/32 |

\* cited by examiner

METHOD AND SYSTEM FOR PERSISTING A CONVERSATION ACROSS MULTIPLE COMMUNICATION CHANNELS

BACKGROUND

1. Field of the Disclosure

This technology generally relates to methods and systems for conducting a conversation between a human and a machine, and more particularly to methods and systems for persisting a human-machine conversation across multiple communication channels so as to facilitate continuity of the conversation regardless of which mode of communication is being utilized at any particular moment.

2. Background Information

The way in which humans interface with online applications is changing to be more similar to the way in which humans interact with other humans. Natural language processing and large language model artificial intelligence (AI) are enabling machines to communicate in a very human-like way. However, at present, such communications are typically conducted over a single channel, such as, for example, a chatbot interface.

Some of the more advanced AI chatbots retain information about the history of the conversation and/or past interactions with the user, which is used to tailor future responses. Other applications present multiple user interfaces, but these are not AI-enabled, the communications are not human-to-human-like and they do not retain conversation history. For example, it may be possible to interact with a social media platform via the browser on a personal computer (PC) or via an application on a smart phone, but the interface will require the user to click on buttons and other objects to get to the area of the application to be accessed, and the notion of "picking up the conversation where you left off" is not feasible.

Accordingly, there is a need for a method for persisting a human-machine conversation across multiple communication channels so as to facilitate continuity of the conversation regardless of which mode of communication is being utilized at any particular moment.

SUMMARY

The present disclosure, through one or more of its various aspects, embodiments, and/or specific features or sub-components, provides, inter alia, various systems, servers, devices, methods, media, programs, and platforms for persisting a human-machine conversation across multiple communication channels so as to facilitate continuity of the conversation regardless of which mode of communication is being utilized at any particular moment.

According to an aspect of the present disclosure, a method for conducting a conversation is provided. The method is implemented by at least one processor. The method includes: receiving, by the at least one processor from a first user via a first channel, a first communication; transmitting, by the at least one processor to the first user via the first channel, a second communication that is responsive to the first communication; receiving, by the at least one processor from the first user via a second channel that is different from the first channel, a third communication; determining, by the at least one processor based on a content of the third communication, that the third communication is responsive to the second communication and that each of the first communication, the second communication, and the third communication is a part of a first conversation; and generating, by the at least one processor, a fourth communication that is responsive to the third communication and is a continuation of the first conversation, and transmitting the fourth communication to the first user via the second channel.

Each of the first channel and the second channel may include at least one from among a web browser, a chat bot, a voice assistant, a desktop application, a smart phone, an email message, an instant messenger message, a desktop assistant, and a mobile application.

The method may further include: receiving, by the at least one processor from the first user via a third channel that is different from each of the first channel and the second channel, a fifth communication; determining, by the at least one processor based on a content of the fifth communication, that the fifth communication is responsive to the fourth communication and is a part of the first conversation; and generating, by the at least one processor, a sixth communication that is responsive to the fifth communication and is a continuation of the first conversation, and transmitting the sixth communication to the first user via the third channel.

The determining may include applying an artificial intelligence (AI) algorithm that uses a Natural Language Processing (NLP) technique to analyze the content of each of the first communication, the second communication, and the third communication.

The method may further include: identifying, based on a result of the analysis of the content, a topic of the first conversation; and determining, based on the result of the analysis of the content, whether the first conversation has ended.

The method may further include: storing each of the first communication and the second communication in a memory; and when the third communication is received, retrieving each of the first communication and the second communication from the memory.

The receiving of the third communication may occur at least 24 hours after the receiving of the first communication.

The receiving of the third communication may occur at least seven days after the receiving of the first communication.

The method may further include: retrieving, from a memory, information that relates to a transaction that is associated with the first conversation; and analyzing the information that relates to the transaction based on the first conversation.

According to another exemplary embodiment, a computing apparatus for conducting a conversation is provided. The computing apparatus includes a processor; a memory; and a communication interface coupled to each of the processor and the memory. The processor is configured to: receive, via the communication interface from a first user via a first channel, a first communication; transmit, via the communication interface to the first user via the first channel, a second communication that is responsive to the first communication; receive, via the communication interface from the first user via a second channel that is different from the first channel, a third communication; determine, based on a content of the third communication, that the third communication is responsive to the second communication and that each of the first communication, the second communication, and the third communication is a part of a first conversation; and generate a fourth communication that is responsive to the third communication and is a continuation of the first conversation, and transmit the fourth communication to the first user via the communication interface and via the second channel.

Each of the first channel and the second channel may include at least one from among a web browser, a chat bot, a voice assistant, a desktop application, a smart phone, an email message, an instant messenger message, a desktop assistant, and a mobile application.

The processor may be further configured to: receive, via the communication interface from the first user via a third channel that is different from each of the first channel and the second channel, a fifth communication; determine, based on a content of the fifth communication, that the fifth communication is responsive to the fourth communication and is a part of the first conversation; and generate a sixth communication that is responsive to the fifth communication and is a continuation of the first conversation, and transmit the sixth communication to the first user via the communication interface and via the third channel.

The processor may be further configured to apply an artificial intelligence (AI) algorithm that uses a Natural Language Processing (NLP) technique to analyze the content of each of the first communication, the second communication, and the third communication.

The processor may be further configured to: identify, based on a result of the analysis of the content, a topic of the first conversation; and determine, based on the result of the analysis of the content, whether the first conversation has ended.

The processor may be further configured to: store each of the first communication and the second communication in the memory; and when the third communication is received, retrieve each of the first communication and the second communication from the memory.

The third communication may be received at least 24 hours after the first communication is received.

The third communication may be received at least seven days after the first communication is received.

The processor may be further configured to: retrieve, from the memory, information that relates to a transaction that is associated with the first conversation; and analyze the information that relates to the transaction based on the first conversation.

According to yet another exemplary embodiment, a non-transitory computer readable storage medium storing instructions for conducting a conversation is provided. The storage medium includes executable code which, when executed by a processor, causes the processor to: receive, from a first user via a first channel, a first communication; transmit, to the first user via the first channel, a second communication that is responsive to the first communication; receive, from the first user via a second channel that is different from the first channel, a third communication; determine, based on a content of the third communication, that the third communication is responsive to the second communication and that each of the first communication, the second communication, and the third communication is a part of a first conversation; and generate a fourth communication that is responsive to the third communication and is a continuation of the first conversation, and transmit the fourth communication to the first user via the second channel.

Each of the first channel and the second channel may include at least one from among a web browser, a chat bot, a voice assistant, a desktop application, a smart phone, an email message, an instant messenger message, a desktop assistant, and a mobile application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
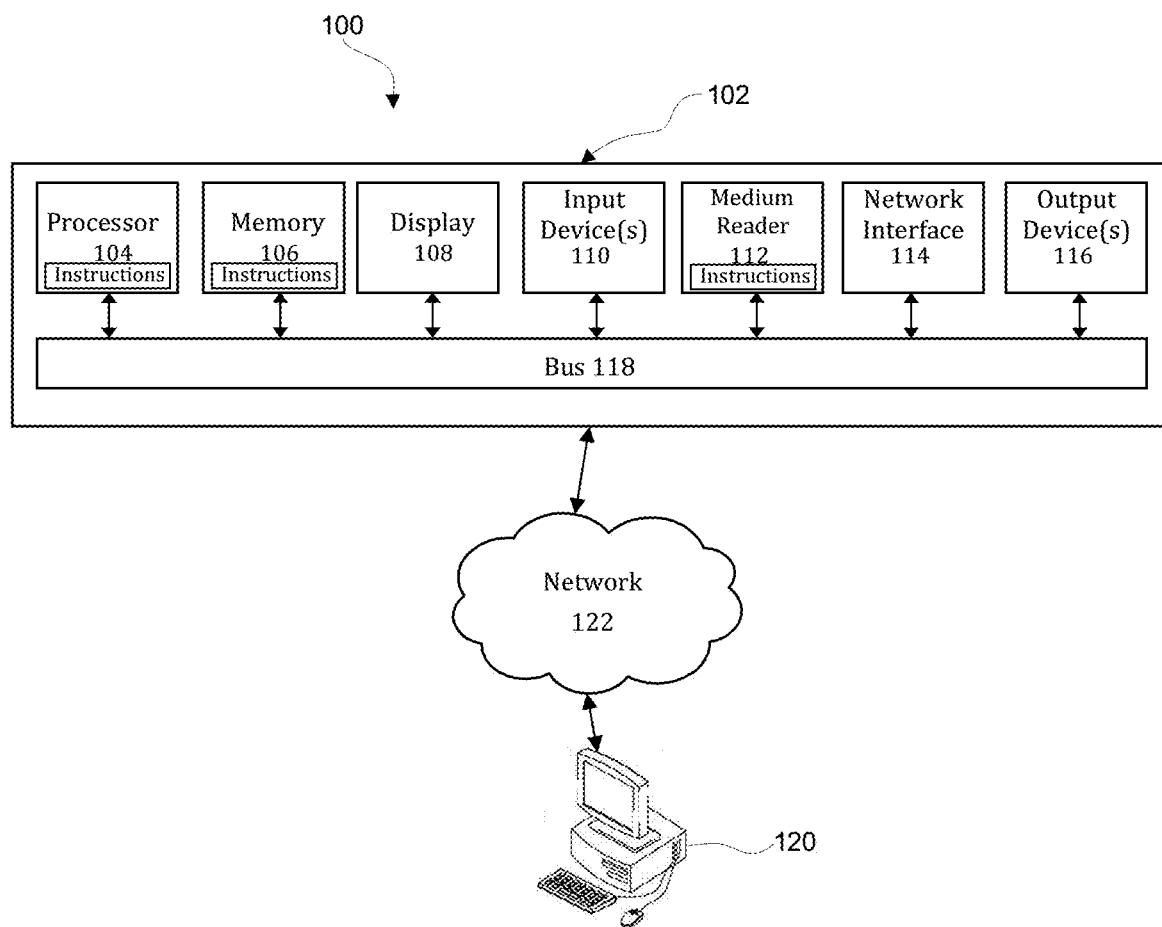
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for persisting a human-machine conversation across multiple communication channels so as to facilitate continuity of the conversation regardless of which mode of communication is being utilized at any particular moment.

Figure 2:
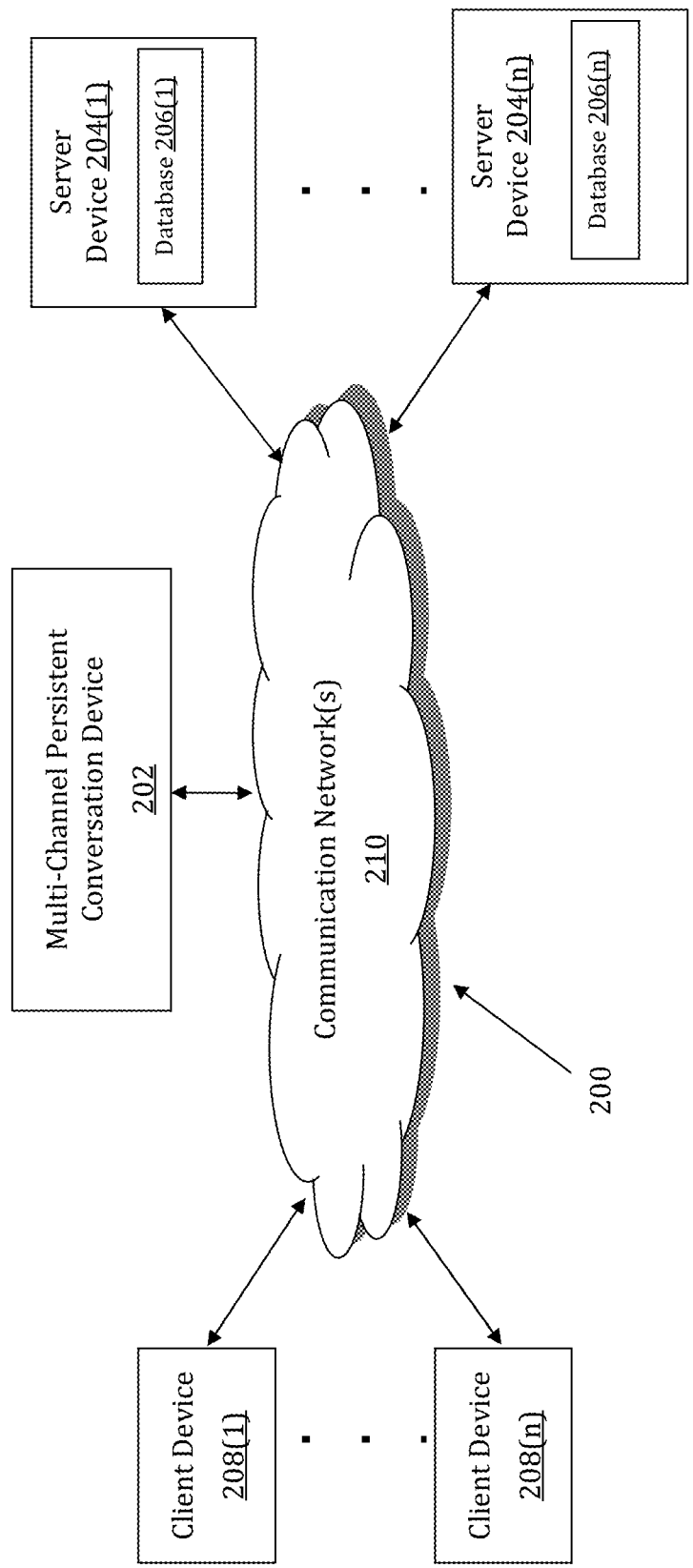
FIG. 2 illustrates an exemplary diagram of a network environment.

Referring to FIG. 2, a schematic of an exemplary network environment 200 for implementing a method for persisting a human-machine conversation across multiple communication channels so as to facilitate continuity of the conversation regardless of which mode of communication is being utilized at any particular moment is illustrated. In an exemplary embodiment, the method is executable on any networked computer platform, such as, for example, a personal computer (PC).

The method for persisting a human-machine conversation across multiple communication channels so as to facilitate continuity of the conversation regardless of which mode of communication is being utilized at any particular moment may be implemented by a Multi-Channel Persistent Conversation (MCPC) device 202. The MCPC device 202 may be the same or similar to the computer system 102 as described with respect to FIG. 1. The MCPC device 202 may store one or more applications that can include executable instructions that, when executed by the MCPC device 202, cause the MCPC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MCPC device 202 itself, may be located in virtual server(s) running in a cloud-based computing environment rather than being tied to one or more specific physical network computing devices. Also, the application(s) may be running in one or more virtual machines (VMs) executing on the MCPC device 202. Additionally, in one or more embodiments of this technology, virtual machine(s) running on the MCPC device 202 may be managed or supervised by a hypervisor.

In the network environment 200 of FIG. 2, the MCPC device 202 is coupled to a plurality of server devices 204(1)-204(n) that hosts a plurality of databases 206(1)-206(n), and also to a plurality of client devices 208(1)-208(n) via communication network(s) 210. A communication interface of the MCPC device 202, such as the network interface 114 of the computer system 102 of FIG. 1, operatively couples and communicates between the MCPC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCPC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MCPC devices that efficiently implement a method for persisting a human-machine conversation across multiple communication channels so as to facilitate continuity of the conversation regardless of which mode of communication is being utilized at any particular moment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MCPC device 202 may be a standalone device or integrated with one or more other devices or apparatuses, such as one or more of the server devices 204(1)-204(n), for example. In one particular example, the MCPC device 202 may include or be hosted by one of the server devices 204(1)-204(n), and other arrangements are also possible. Moreover, one or more of the devices of the MCPC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MCPC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to transactions and business states and information that relates to conversation states.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MCPC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MCPC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MCPC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MCPC device 202, the server devices 204(1)-204(n), or the client devices 208(1)-208(n), for example, may be configured to operate as virtual instances on the same physical machine. In other words, one or more of the MCPC device 202, the server devices 204(1)-204(n), or the client devices 208(1)-208(n) may operate on the same physical device rather than as separate devices communicating through communication network(s) 210. Additionally, there may be more or fewer MCPC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
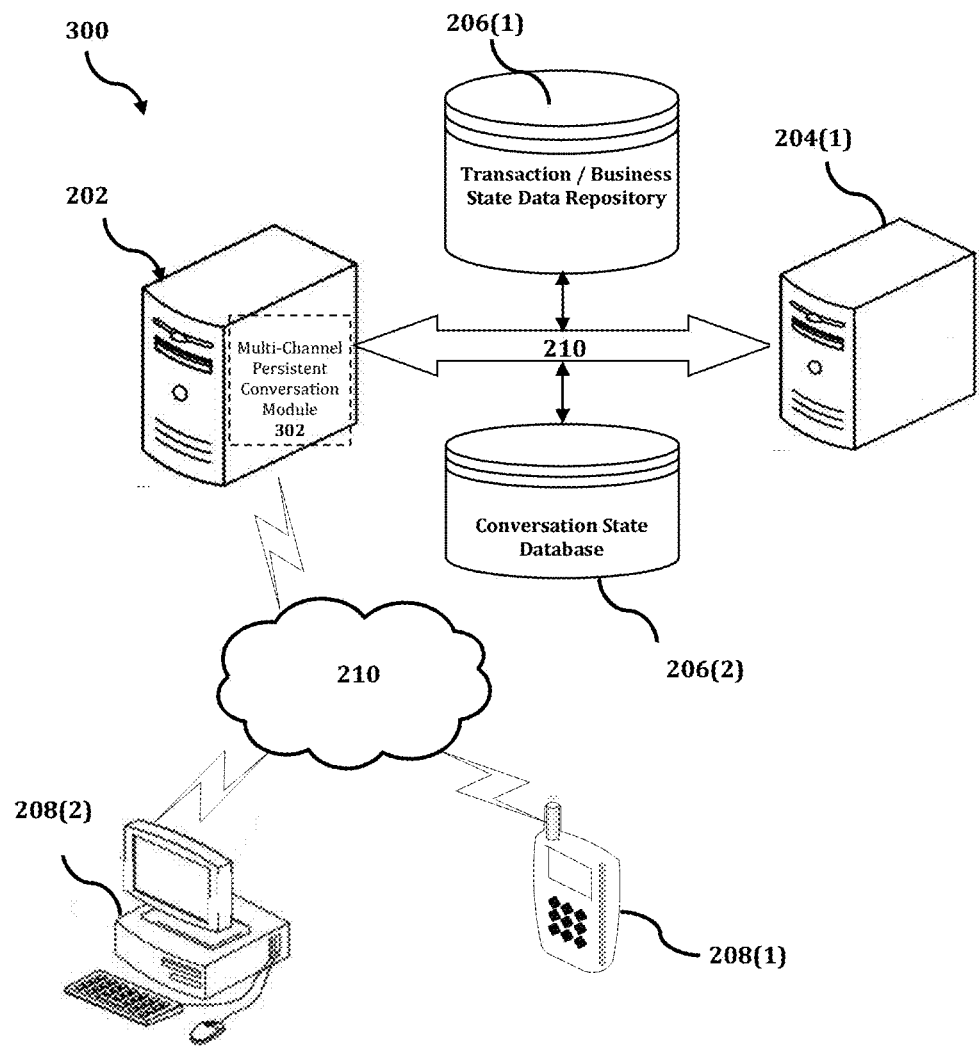
FIG. 3 shows an exemplary system for implementing a method for persisting a human-machine conversation across multiple communication channels so as to facilitate continuity of the conversation regardless of which mode of communication is being utilized at any particular moment.

The MCPC device 202 is described and illustrated in FIG. 3 as including a multi-channel persistent conversation module 302, although it may include other rules, policies, modules, databases, or applications, for example. As will be described below, the multi-channel persistent conversation module 302 is configured to implement a method for persisting a human-machine conversation across multiple communication channels so as to facilitate continuity of the conversation regardless of which mode of communication is being utilized at any particular moment.

An exemplary process 300 for implementing a mechanism for persisting a human-machine conversation across multiple communication channels so as to facilitate continuity of the conversation regardless of which mode of communication is being utilized at any particular moment by utilizing the network environment of FIG. 2 is illustrated as being executed in FIG. 3. Specifically, a first client device 208(1) and a second client device 208(2) are illustrated as being in communication with MCPC device 202. In this regard, the first client device 208(1) and the second client device 208(2) may be "clients" of the MCPC device 202 and are described herein as such. Nevertheless, it is to be known and understood that the first client device 208(1) and/or the second client device 208(2) need not necessarily be "clients" of the MCPC device 202, or any entity described in association therewith herein. Any additional or alternative relationship may exist between either or both of the first client device 208(1) and the second client device 208(2) and the MCPC device 202, or no relationship may exist.

Further, MCPC device 202 is illustrated as being able to access a transaction/business state data repository 206(1) and a conversation state database 206(2). The multi-channel persistent conversation 302 may be configured to access these databases for implementing a method for persisting a human-machine conversation across multiple communication channels so as to facilitate continuity of the conversation regardless of which mode of communication is being utilized at any particular moment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MCPC device 202 via broadband or cellular communication. Of course, these embodiments are merely exemplary and are not limiting or exhaustive.

Upon being started, the multi-channel persistent conversation module 302 executes a process for persisting a human-machine conversation across multiple communication channels so as to facilitate continuity of the conversation regardless of which mode of communication is being utilized at any particular moment. An exemplary process for persisting a human-machine conversation across multiple communication channels so as to facilitate continuity of the conversation regardless of which mode of communication is being utilized at any particular moment is generally indicated at flowchart 400 in FIG. 4.

Figure 4:
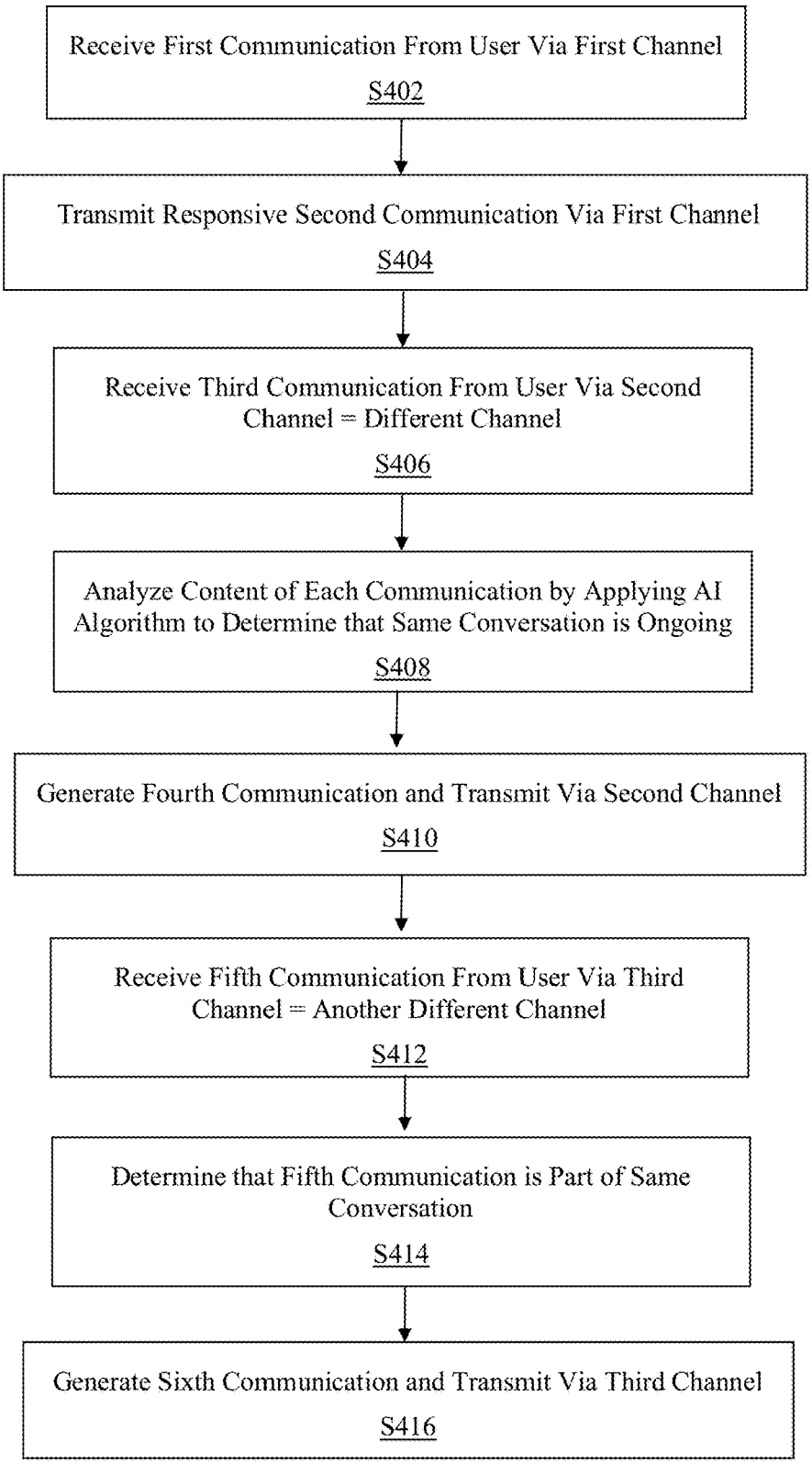
FIG. 4 is a flowchart of an exemplary process for implementing a method for persisting a human-machine conversation across multiple communication channels so as to facilitate continuity of the conversation regardless of which mode of communication is being utilized at any particular moment.

In process 400 of FIG. 4, at step S402, the multi-channel persistent conversation module 302 receives a first communication from a user via a first communication channel. In an exemplary embodiment, the first channel may include any one or more of a web browser, a chat bot, a voice assistant, a desktop application, a smart phone, an email message, an instant messenger message, a desktop assistant, and a mobile application. Then, at step S404, the multi-channel persistent conversation module 302 generates a second communication that is responsive to the first communication and then transmits the second communication to the user via the first channel.

At step S406, the multi-channel persistent conversation module 302 receives a third communication from the user via a second communication channel that is different from the first channel. In an exemplary embodiment, the second channel may also include any one or more of a web browser, a chat bot, a voice assistant, a desktop application, a smart phone, an email message, an instant messenger message, a desktop assistant, and a mobile application.

In an exemplary embodiment, the third communication may not be received immediately after the second communication has been transmitted; instead, a significant amount of time may pass between communications. For example, the third communication may be received at least 24 hours after the first communication is received; the third communication may be received at least seven days after the first communication is received; the third communication may be received at least one month after the first communication is received; or the third communication may be received at any other suitable interval of time after the first communication is received. In this aspect, each of the first communication and the second communication may be stored in a memory, and then, when the third communication is received, the first communication and the second communication may be retrieved from the memory in order to facilitate a subsequent determination that the third communication is part of the same ongoing conversation.

At step S408, the multi-channel persistent conversation module 302 determines, based on a content of the third communication, that the third communication is responsive to the second communication, and that each of the first, second, and third communications is part of a single ongoing conversation. In an exemplary embodiment, this determination is made by applying an artificial intelligence (AI) algorithm that uses a Natural Language Processing (NLP) technique to analyze the content of each of the first, second, and third communications. Then, at step S410, the multi-channel persistent conversation module 302 generates a fourth communication that is responsive to the third communication and is a continuation of the same conversation, and then transmits the fourth communication to the user via the second channel.

In an exemplary embodiment, as a result of the analysis, the multi-channel persistent conversation module 302 may identify a topic of the conversation, and may also determine whether or not the conversation has ended. Further, in an exemplary embodiment, the multi-channel persistent conversation module 302 may retrieve information that relates to a transaction and/or a business state that is associated with the conversation, and then use a result of the analysis to analyze the information that relates to the transaction and/or the business state.

At step S412, the multi-channel persistent conversation module 302 receives a fifth communication from the user via a third communication channel that is different from both the first channel and the second channel. In an exemplary embodiment, the third channel may also include any one or more of a web browser, a chat bot, a voice assistant, a desktop application, a smart phone, an email message, an instant messenger message, a desktop assistant, and a mobile application.

At step S414, the multi-channel persistent conversation module 302 determines, based on a content of the fifth communication, that the fifth communication is responsive to the fourth communication and is also part of the same ongoing conversation. Then, at step S416, the multi-channel persistent conversation module 302 generates a sixth communication that is responsive to the fifth communication and is a continuation of the same conversation, and then transmits the sixth communication to the user via the third channel. In this aspect, the multi-channel persistent conversation module 302 is able to persist a single continuous conversation across multiple communication channels.

Interestingly, in the case of a communications platform, such as an instant messaging application, the history of a conversation between one person and another person is retained, and the participants can (and frequently do) pick up the conversation where it left off. This highlights that persistence of conversation is a key trait of human-to-human interaction.

The following is a scenario that illustrates a methodology according to an exemplary embodiment: 1) A person calls a personal travel advisor and asks the advisor to come up with some itinerary proposals for a two-week trip over Easter. 2) Later that day, the person receives an email with three high-level itineraries for trips to Italy, Spain and Thailand. 3) The person sends an instant message the travel advisor to tell the advisor that the person likes the sound of Spain and to ask the advisor to flesh that out with flight, accommodation and price. 4) The next day, the travel advisor calls the person via telephone to go through the details and confirm the booking.

Throughout this process, there is a shared memory of the state of the conversation between the person and the travel advisor. For example, at step 3, the message need only say, "Let's go with the Spain option". The fact that the conversation takes place over three different communication channels (i.e., telephone, email, and instant message) makes no difference.

In an exemplary embodiment, this is the way human-machine interactions occur; namely, they are conversational in nature and persist across multiple channels, including, for example, any one or more of a telephone call, a chat, a voice assistant, a desktop assistant, an instant messenger, email, a web interface, a mobile application, a desktop application, and/or any other suitable type of channel. This allows both parties to choose the most appropriate or preferred communication channel at any particular moment in time.

Figure 5:
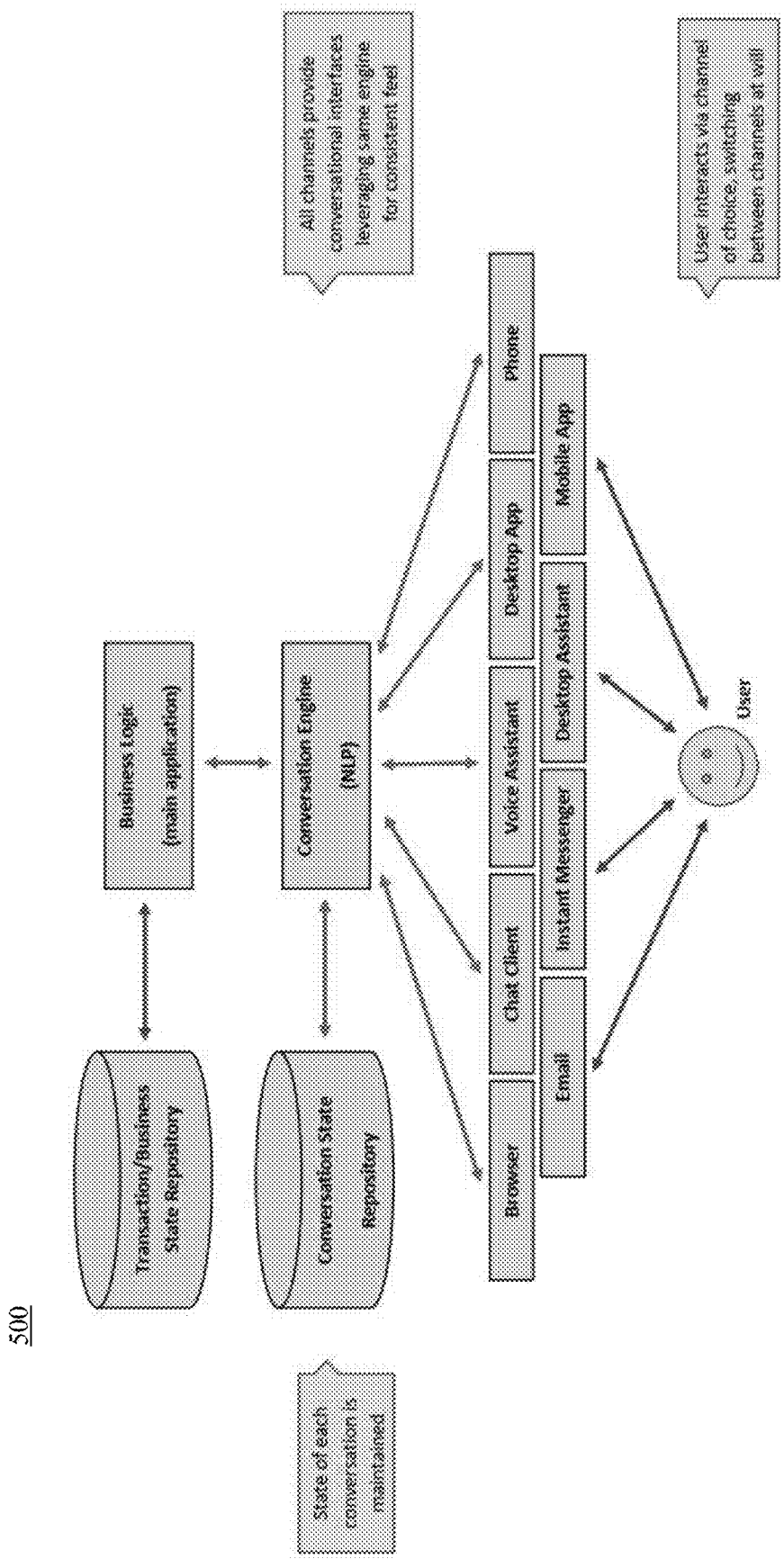
FIG. 5 is an architecture diagram that illustrates an implementation of a system that is configured to execute a method for persisting a human-machine conversation across multiple communication channels so as to facilitate continuity of the conversation regardless of which mode of communication is being utilized at any particular moment, according to an exemplary embodiment.

FIG. 5 is an architecture diagram 500 that illustrates an implementation of a system that is configured to execute a method for persisting a human-machine conversation across multiple communication channels so as to facilitate continuity of the conversation regardless of which mode of communication is being utilized at any particular moment, according to an exemplary embodiment.

In an exemplary embodiment, this objective is achieved by requiring that a conversation state be stored by the application and made available to each of its interfaces. Additionally, the application is able to identify topics of conversation and when they are closed (i.e., a change of subject). In an exemplary embodiment, the history of these topics is retained for an extended period such that they can be recalled and the conversation thread picked up at a later date. As with human memory, the level of retained detail from these historical conversations may be gradually reduced over time. For example, referring to the example described above, after a year, rather than retaining the full itineraries, the list of stops on the proposed trip may be sufficient.

In an exemplary embodiment, the conversational style of the application is consistent across channels, so that it appears that the conversation is being conducted between the same two parties, regardless of the channel being used. This requirement may be satisfied by utilizing the same core natural language processing and generation components to drive all interfaces.

Accordingly, with this technology, an optimized process for persisting a human-machine conversation across multiple communication channels so as to facilitate continuity of the conversation regardless of which mode of communication is being utilized at any particular moment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for conducting a conversation, the method being implemented by at least one processor, the method comprising:
   receiving, by the at least one processor from a first user via a first channel, a first communication;
   transmitting, by the at least one processor to the first user via the first channel, a second communication that is responsive to the first communication;
   receiving, by the at least one processor from the first user via a second channel that is different from the first channel, a third communication;
   determining, by the at least one processor based on a content of the third communication, that the third communication is responsive to the second communication and that each of the first communication, the second communication, and the third communication is a part of a first conversation; and
   generating, by the at least one processor, a fourth communication that is responsive to the third communication and is a continuation of the first conversation, and transmitting the fourth communication to the first user via the second channel.

2. The method of claim 1, wherein each of the first channel and the second channel includes at least one from among a web browser, a chat bot, a voice assistant, a desktop application, a smart phone, an email message, an instant messenger message, a desktop assistant, and a mobile application.

3. The method of claim 1, further comprising:
   receiving, by the at least one processor from the first user via a third channel that is different from each of the first channel and the second channel, a fifth communication;
   determining, by the at least one processor based on a content of the fifth communication, that the fifth communication is responsive to the fourth communication and is a part of the first conversation; and
   generating, by the at least one processor, a sixth communication that is responsive to the fifth communication and is a continuation of the first conversation, and transmitting the sixth communication to the first user via the third channel.

4. The method of claim 1, wherein the determining comprises applying an artificial intelligence (AI) algorithm that uses a Natural Language Processing (NLP) technique to analyze the content of each of the first communication, the second communication, and the third communication.

5. The method of claim 4, further comprising:
   identifying, based on a result of the analysis of the content, a topic of the first conversation; and
   determining, based on the result of the analysis of the content, whether the first conversation has ended.

6. The method of claim 1, further comprising:
   storing each of the first communication and the second communication in a memory; and
   when the third communication is received, retrieving each of the first communication and the second communication from the memory.

7. The method of claim 1, wherein the receiving of the third communication occurs at least 24 hours after the receiving of the first communication.

8. The method of claim 7, wherein the receiving of the third communication occurs at least seven days after the receiving of the first communication.

9. The method of claim 1, further comprising:
   retrieving, from a memory, information that relates to a transaction that is associated with the first conversation; and
   analyzing the information that relates to the transaction based on the first conversation.

10. A computing apparatus for conducting a conversation, the computing apparatus comprising:
    a processor;
    a memory; and
    a communication interface coupled to each of the processor and the memory,
    wherein the processor is configured to:
      receive, via the communication interface from a first user via a first channel, a first communication;
      transmit, via the communication interface to the first user via the first channel, a second communication that is responsive to the first communication;
      receive, via the communication interface from the first user via a second channel that is different from the first channel, a third communication;
      determine, based on a content of the third communication, that the third communication is responsive to the second communication and that each of the first communication, the second communication, and the third communication is a part of a first conversation; and
      generate a fourth communication that is responsive to the third communication and is a continuation of the first conversation, and transmit the fourth communication to the first user via the communication interface and via the second channel.

11. The computing apparatus of claim 10, wherein each of the first channel and the second channel includes at least one from among a web browser, a chat bot, a voice assistant, a desktop application, a smart phone, an email message, an instant messenger message, a desktop assistant, and a mobile application.

12. The computing apparatus of claim 10, wherein the processor is further configured to:
  receive, via the communication interface from the first user via a third channel that is different from each of the first channel and the second channel, a fifth communication;
  determine, based on a content of the fifth communication, that the fifth communication is responsive to the fourth communication and is a part of the first conversation; and
  generate a sixth communication that is responsive to the fifth communication and is a continuation of the first conversation, and transmit the sixth communication to the first user via the communication interface and via the third channel.

13. The computing apparatus of claim 10, wherein the processor is further configured to apply an artificial intelligence (AI) algorithm that uses a Natural Language Processing (NLP) technique to analyze the content of each of the first communication, the second communication, and the third communication.

14. The computing apparatus of claim 13, wherein the processor is further configured to:
  identify, based on a result of the analysis of the content, a topic of the first conversation; and
  determine, based on the result of the analysis of the content, whether the first conversation has ended.

15. The computing apparatus of claim 10, wherein the processor is further configured to:
  store each of the first communication and the second communication in the memory; and
  when the third communication is received, retrieve each of the first communication and the second communication from the memory.

16. The computing apparatus of claim 10, wherein the third communication is received at least 24 hours after the first communication is received.

17. The computing apparatus of claim 16, wherein the third communication is received at least seven days after the first communication is received.

18. The computing apparatus of claim 10, wherein the processor is further configured to:
  retrieve, from the memory, information that relates to a transaction that is associated with the first conversation; and
  analyze the information that relates to the transaction based on the first conversation.

19. A non-transitory computer readable storage medium storing instructions for conducting a conversation, the storage medium comprising executable code which, when executed by a processor, causes the processor to:
  receive, from a first user via a first channel, a first communication;
  transmit, to the first user via the first channel, a second communication that is responsive to the first communication;
  receive, from the first user via a second channel that is different from the first channel, a third communication;
  determine, based on a content of the third communication, that the third communication is responsive to the second communication and that each of the first communication, the second communication, and the third communication is a part of a first conversation; and
  generate a fourth communication that is responsive to the third communication and is a continuation of the first conversation, and transmit the fourth communication to the first user via the second channel.

20. The storage medium of claim 19, wherein each of the first channel and the second channel includes at least one from among a web browser, a chat bot, a voice assistant, a desktop application, a smart phone, an email message, an instant messenger message, a desktop assistant, and a mobile application.

\* \* \* \* \*